United States Patent [19]

Kobayashi

[11] E Patent Number: Re. 33,488

[45] Reissued Date of Patent: Dec. 11, 1990

[54] MARINE VESSEL WITH INTERNAL COMBUSTION ENGINE HAVING AN EXHAUST PIPE

[75] Inventor: Noboru Kobayashi, Kosai, Japan

[73] Assignee: Yamaha Hatsudoki Kabushiki Kaisha, Iwata, Japan

[21] Appl. No.: 419,937

[22] Filed: Oct. 11, 1989

Related U.S. Patent Documents

Reissue of:

[64] Patent No.: 4,824,409
Issued: Apr. 25, 1989
Appl. No.: 178,836
Filed: Mar. 23, 1988

U.S. Applications:

[63] Continuation of Ser. No. 934,229, Nov. 21, 1986, abandoned.

[30] Foreign Application Priority Data

Nov. 26, 1985 [JP] Japan ..... 60-265889

[51] Int. Cl.[5] ..... B63H 11/02

[52] U.S. Cl. ..... 440/47; 440/89

[58] Field of Search ..... 114/270; 440/38, 40, 440/44, 47, 89; 60/221, 222

[56] References Cited

U.S. PATENT DOCUMENTS

| | | | |
|---|---|---|---|
| 3,273,333 | 9/1966 | Roulund | 440/44 |
| 3,624,737 | 11/1971 | Keller | 440/47 |
| 3,659,547 | 5/1972 | Stuart | 440/89 |
| 3,943,876 | 3/1976 | Kiekhaefer | 440/47 |
| 4,141,309 | 2/1979 | Halboth | 114/61 |
| 4,552,537 | 11/1985 | Haynes | 440/47 |
| 4,616,168 | 10/1986 | Nishida | 114/270 |
| 4,643,685 | 2/1987 | Nishida | 440/42 |

*Primary Examiner*—Joseph F. Peters, Jr.
*Assistant Examiner*—Stephen P. Avila
*Attorney, Agent, or Firm*—Jordan and Hamburg

[57] ABSTRACT

A boat having an internal combustion engine with an exhaust pipe comprises a boat body having a bow and a stern, and a hollow section formed in the boat body. The hollow section is provided with at least one opening at the stern for communication between the hollow section and the atmosphere. The exhaust pipe is connected to the hollow section so that exhaust gas from the engine is exhausted to the atmosphere through the hollow section.

2 Claims, 1 Drawing Sheet

MARINE VESSEL WITH INTERNAL COMBUSTION ENGINE HAVING AN EXHAUST PIPE

Matter enclosed in heavy brackets [ ] appears in the original patent but forms no part of this reissue specification; matter printed in italics indicates the additions made by reissue.

This application is a continuation of Ser. No. 934,229, filed Nov. 21, 1986, now abandoned.

BACKGROUND OF THE INVENTION AND RELATED ART STATEMENT

The present invention relates to a boat, more particularly, a small boat operated by an internal combustion engine.

In a small boat equipped with an internal combustion engine, an exhaust pipe connected to an exhaust system of the engine is lead outside the boat and is fixed at a desired position. If a funnel is attached to the exhaust pipe, the outside appearance of the boat is not attractive. On the other hand, if an exhaust pipe is directly exposed outside of the boat without use of a funnel, the area adjacent to the exhaust pipe becomes dirty by the exhaust gas.

Since the funnel or the area adjacent the exhaust pipe is substantially directly exposed outside the boat, the funnel and the adjacent area becomes hot. Therefore, it is dangerous to touch these portions.

Accordingly, an object of the present invention is to obviate the above drawbacks of the prior art.

Another object of the invention is to provide a boat, which does not become dirty by the exhaust gas of an engine.

A further object of the invention is to provide a boat as stated above, in which danger caused by hot exhaust gas is substantially eliminated.

A still further object of the invention is to provide a boat as stated above, in which the exhaust ability is improved.

Further objects and advantages of the invention will be apparent from the following description of the invention.

SUMMARY OF THE INVENTION

A boat in accordance with the present invention is equipped with and operated by an internal combustion engine with an exhaust pipe. The boat comprises a boat body having a bow and a stern, and a hollow section formed on the boat body. The hollow section includes at least one opening at the stern for communication between the hollow section and atmosphere. The exhaust pipe is connected to the hollow section so that exhaust gas from the engine is exhausted to atmosphere through the hollow section.

The boat is further provided with a propelling device connected to the engine. The propelling device is situated in the hollow section so that when the boat is moved by the engine, the hollow section is exposed to negative pressure by the propelling device to thereby exhaust the exhaust gas smoothly through the hollow section.

The propelling device includes a flow conduit located in the hollow section, and a propeller situated in the flow conduit. The propeller is connected to the engine so that when the engine is actuated, the propeller operates to eject water from the flow conduit to advance the boat.

DETAILED DESCRIPTION OF A PREFERRED EMBODIMENT

Figure 1:
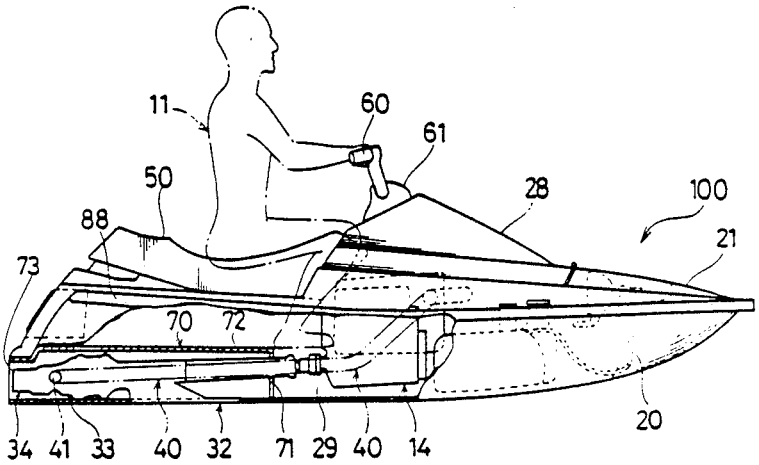
FIG. 1 is a partly cut side view of a boat in accordance with the present invention.
Figure 2:
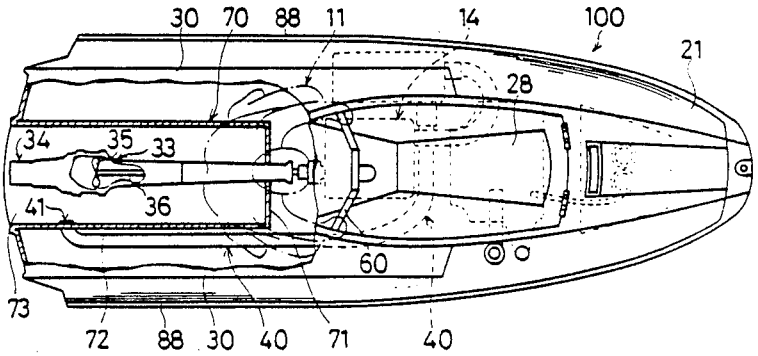
FIG. 2 is a partly cut plan view of a boat of the present invention.

Referring to FIGS. 1 and 2, a boat 100 in accordance with the present invention is shown. The boat 100 comprises a bottom member 20, gunwales 88 extending from a bow to stern, and an upper deck 21 at an upper front portion of the boat. An engine compartment 29 is formed in a sealed space substantially surrounded by the bottom member 20 and the upper deck 21.

A seat 50 is formed on the boat 100 rearwardly of the upper deck 21. The seat 50 extends upwardly beyond the gunwales 88 and also extends rearwardly from a center of the boat 100 to the stern. A foot deck 30 is formed adjacent to the bottom member 20 between the seat 50 and the gunwales 88. The foot deck 30 extends rearwardly without being blocked.

In the center portion of the boat 100 slightly frontward of the seat 50, a hatch 28 which is a part of the upper deck 21 is openably provided. A handle support 61 for supporting a handle is formed adjacent to the hatch 28. In operation, an operator 11 sits on the seat 50 with legs on the foot deck 30 and holds the handle 60 to drive the boat 100. In this condition, the operator can move his body to the right and left, or fore and back.

The boat 100 is provided, under the seat 50, with a water inlet 32 formed in the bottom member 20, a flow path 33 connected to the inlet 32, and a nozzle 34 at the stern. The nozzle 34 is connected to the flow path 33 so that the nozzle 34 can pivot horizontally. A propeller 35 operationally connected to an engine 14 by a shaft 36 is situated in the flow path 33. When the engine 14 is actuated, the propeller 35 rotates to thereby take in water from the inlet 32 and eject water rearwardly from the nozzle 34 through the flow path 33. The boat 100 moves by ejection of water. The direction of the boat 100 can be changed by changing the direction of the nozzle 34.

A hollow section 70 is formed between the seat 50 and the bottom member 20, in which the flow path 33 and the nozzle 34 are situated. Namely, an inverted U-shaped plate 72 in cross section is attached to the bottom member 20. The seat 50 is placed onto the plate 72. A front end of the hollow section 70 is closed by a partition member 71, and a rear end thereof is left open rearwardly to form an opening 73, through which water from the nozzle 34 is ejected.

The shaft 36 of the engine 14 passes through the partition plate 71 and is connected to the propeller 35 in the flow path 33. An exhaust pipe 40 connected to the engine 14 extends rearwardly alongside the hollow section 70. An outlet 41 of the exhaust pipe 40 passes through the plate 72 adjacent to the flow path 33.

Accordingly, when the engine 14 is actuated, exhaust gas from the engine 14 is lead to the hollow section 70 through the exhaust pipe 40. The exhaust gas in the hollow section 70 is then exhausted to atmosphere through the opening 73. Therefore, exhaust gas does not contact the outer surface of the boat 100. The area where exhaust gas contacts the boat is adjacent to the outlet 41 inside the hollow section 70, which can not be seen from outside. Therefore, there is no possibility that the boat 100 will become dirty by the exhaust gas.

Further, since the exhaust pipe 40 and the outlet 41 are not directly exposed outside, there is no possibility that anyone will be injured by hot exhaust gas. Also, there is no possibility that an operator breathes in exhaust gas. This structure also provides an advantage that noise from the engine is diminished.

Further, when the boat 100 is cruising, water is ejected from the nozzle 34, so that pressure inside the hollow section 70 is lower than atmosphere. Consequently, the hollow section 70 draws in exhaust gas, to thereby improve exhaust ability.

While the invention has been explained with reference to a specific embodiment of the invention, the explanation is illustrative and the invention is limited only by the appended claims.

What is claimed is:

1. A boat operated by an internal combustion engine comprising a boat body having a bow and a stern, said engine being mounted on said boat body, inlet means in said boat body for receiving water from outside the boat body, a flow passage means extending from said inlet means to the stern of the boat, said flow passage means having an outlet nozzle disposed at the stern of the boat through which the water exits from the flow passage means, a propeller disposed within said flow passage means, a hollow enclosure means mounted on said boat body and enclosing therein substantially the entire flow passage means, said hollow enclosure means having two generally upright side [walls extending fore and aft] *wall means* and a top wall connected to said *two* upright side [walls] *wall means* such that said hollow enclosure means has a substantially inverted U-shaped cross-sectional configuration, said hollow enclosure means also having an opening at one end thereof located at the stern of the boat, said hollow enclosure means further having a forward transverse wall, a propeller drive shaft extending between said engine and said propeller, a propeller shaft enclosure means disposed about said shaft, said propeller shaft enclosure means being connected to said flow passage means and extending forward of said inlet means, said propeller shaft enclosure means extending through said forward transverse wall of said hollow enclosure means, said engine having an exhaust conduit connected to one of said *two* side [walls] *walls means* of said hollow enclosure means such that exhaust gases from the engine pass into said hollow enclosure means and exit the latter through said opening in said hollow enclosure means, said flow passage means being spaced from said *two* upright side [walls] *wall means* and also being spaced from said top wall, said flow passage means being thereby disposed within said hollow enclosure means such that under operating conditions of the boat, a pressure less than atmospheric pressure is provided within the hollow enclosure means to facilitate the exhaust of the engine exhaust gases from said exhaust conduit into said hollow enclosure means.

2. A boat according to claim 1, wherein said boat body comprises a bottom section and a top deck section, said inlet means being in said bottom section, said hollow enclosure means being disposed between said top deck section and said bottom section and being mounted on said bottom section.

* * * * *